United States Patent [19]

Campbell

[11] Patent Number: 5,673,510
[45] Date of Patent: Oct. 7, 1997

[54] CRABBING APPARATUS

[76] Inventor: Iver Campbell, P.O. Box 131, Gambell, Ak. 99742-0131

[21] Appl. No.: 582,954

[22] Filed: Jan. 4, 1996

[51] Int. Cl.$^6$ .................................................. A01K 69/10
[52] U.S. Cl. ........................................................ 43/105
[58] Field of Search ............................... 43/100, 103, 105

[56] References Cited

U.S. PATENT DOCUMENTS

| | | | |
|---|---|---|---|
| 132,476 | 10/1872 | Livaudais | 43/105 |
| 458,456 | 8/1891 | Hefftner | 43/105 |
| 1,403,171 | 1/1922 | Koenig | 43/105 |
| 1,531,299 | 3/1925 | Merle | 43/105 |
| 3,553,881 | 1/1971 | Hasseman | 43/105 |
| 4,141,172 | 2/1979 | Prosol | 43/105 |
| 4,182,068 | 1/1980 | Iannucci | 43/105 |
| 4,821,451 | 4/1989 | Matson | 43/105 |

*Primary Examiner*—Kurt Rowan

[57] ABSTRACT

A crabbing apparatus for ice crabbing including a bottom flat plate having a plurality of holes forming five connecting hole pairs therethrough; a top flat plate having a plurality of holes forming five connecting hole pairs and four tying holes therethrough, each hole of the connecting hole pairs of the top plate being axially aligned with each hole of the connecting hole pairs of the bottom plate; a net member being positioned on the the bottom plate having five end edges and a mesh therebetween; five elongated ribs with each rib having an external end with an aperture having an eye bolt coupled within and an internal end being interposed between the top plate and the bottom plate having a pair of holes therethrough for coupling with the connecting holes of the top and bottom plates, each rib being coupled to the net member to from a pentagonal shaped apparatus capable of maintaining a position on a recipient surface; a rectangular member being positioned on the top plate having four securing holes positioned therethrough; a pair of bait lines positioned on the top plate and beneath the rectangular member; a float having an upper eyelet with a pull rope attached and a lower eyelet; and five pull lines with each having a proximal end coupled to the lower eyelet and a distal end coupled to an associated eye bolt of each rib.

17 Claims, 4 Drawing Sheets

CRABBING APPARATUS

BACKGROUND OF THE INVENTION

1. Field of the Invention

The present invention relates to a crabbing apparatus and more particularly pertains to allowing a weighted apparatus placed through an opening cut in the frozen surface of a body of water to lye flat on the water's floor for trapping crabs and further allowing the apparatus, with trapped crabs, to be pulled from the water's floor through the opening in the water's frozen surface when in a closed configuration.

2. Description of the Prior Art

The use of crab catching devices is known in the prior art. More specifically, crab catching devices heretofore devised and utilized for the purpose of catching crabs are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,305,219 to Ratliffe discloses a crab-catching device. U.S. Pat. No. 4,406,083 to Hart discloses a crab catcher. U.S. Pat. Des. 304,753 to Whitesell discloses a crab-catching ring. U.S. Pat. No. 5,048,222 to Correll discloses a crap catcher. Lastly, U.S. Pat. No. 5,218,781 to Miller discloses a collapsible king crab pot with one-piece net.

In this respect, the crabbing apparatus according to the present invention substantially departs from the conventional concepts and designs of the prior art, and in doing so provides an apparatus primarily developed for the purpose of allowing a weighted apparatus placed through an opening cut in the frozen surface of a body of water to lye flat on the water's floor for trapping crabs and further allowing the apparatus, with trapped crabs, to be pulled from the water's floor through the opening in the water's frozen surface when in a closed configuration.

Therefore, it can be appreciated that there exists a continuing need for a new and improved crabbing apparatus which can be used for allowing a weighted apparatus placed through an opening cut in the frozen surface of a body of water to lye flat on the water's floor for trapping crabs and further allowing the apparatus, with trapped crabs, to be pulled from the water's floor through the opening in the water's frozen surface when in a closed configuration. In this regard, the present invention substantially fulfills this need.

SUMMARY OF THE INVENTION

In view of the foregoing disadvantages inherent in the known types of crab catching devices now present in the prior art, the present invention provides an improved crabbing apparatus. As such, the general purpose of the present invention, which will be described subsequently in greater detail, is to provide a new and improved crabbing apparatus and method which has all the advantages of the prior art and none of the disadvantages.

To attain this, the present invention essentially comprises, in combination, a bottom flat cylindrical plate formed of a rigid material having an exterior surface, an interior surface and an outer edge therebetween. The bottom plate further has a plurality of holes therethrough. The holes form five connecting hole pairs. Each connecting hole pair is symmetrically spaced apart from the other connecting hole pairs and adjacent the outer edge. The bottom plate has a diameter of about four inches. Also included is a top plate. The top plate is a flat cylindrical plate formed of a rigid material having an exterior surface, an interior surface and an outer edge therebetween. The top plate is in a horizontal plane parallel to and above the bottom plate with a space formed between the top and bottom plate. The top plate has a plurality of holes therethrough. The holes form five connecting hole pairs and four tying holes. Each connecting hole pair is symmetrically spaced apart from the other connecting hole pairs and adjacent to the outer edge. Each hole of the connecting hole pairs of the top plate is aligned along a common axis with each hole of the connecting hole pairs of the bottom plate. Each tying hole is adjacent the other tying holes. The tying holes is spaced apart and centrally positioned through the top plate. The top plate having a diameter of about four inches. A pentagonally shaped net member formed of flexible material having five end edges and a mesh therebetween is included. Each end edge has a pair of end points with each end point being common to an end point of an adjacent end edge. The mesh has square openings of about 3 inches. The net member is positioned on the interior surface of the bottom plate in a horizontal plane below the top plate. The end edges are spaced an equal distance from the outer edge of the bottom plate and the top plate. At least five elongated oblong ribs of flexible material positioned in a horizontal plane above the net member and below the top plate are included. Each rib having an external end with an aperture therein and a internal end with a pair of holes therethrough. Each rib having a length of about 2 to 4½ feet. Each rib has a plurality of fasteners coupling the ribs to the net member. Each fastener engages the rib and the mesh at intervals along the rib beginning at a position adjacent each external end and each end point of the net. Each external end has an eye bolt coupled within the aperture. Each internal end is interposed within the space between the top plate and the bottom plate. Each hole of the pair of holes is aligned along the common axis of each hole of the connecting hole pairs of the top plate and bottom plate, with rivets coupling the connecting hole pairs and the internal ends of the ribs. The ribs extend from the top plate and the bottom plate in five different directions. The ribs coupled to the top and bottom plate and are secured to the net member with the fasteners form a pentagonal shape apparatus capable of maintaining a flat position on a recipient surface. Further included is a generally rectangular member formed of rigid material having a flat upper surface, a flat lower surface and a plurality of rectangular side walls therebetween. The rectangular member has four securing holes positioned therethrough. The lower surface is positionable on the exterior surface of the top plate. Each securing hole is aligned along a common axis with each tying hole of the top plate. The securing holes and the tying holes are coupled with a pair of strings. The rectangular member has a weight of about between 2 and 4 pounds. A pair of bait lines are included. The bait lines are formed of flexible material having a pair of distal ends, and an intermediate portion positioned on the exterior surface of the top plate beneath the lower surface of the rectangular member. Each distal end is capable of supporting crab bait within the net member. A spherical float of rigid material having exterior surface with an upper eyelet and a lower eyelet attached thereto is provided. The float has a cavity with air trapped within. The upper eyelet has a pull rope formed of flexible material coupled thereto. The pull rope has a diameter of about ⅛ inch and capable of being held by a holding member. Lastly, five pull lines are included. Each pull line has a proximal end coupled to the lower eyelet of the float and a distal end coupled to an associated eye bolt of each rib with an intermediate portion of each pull line extending through an adjacent eye bolt. Each pull line is formed of flexible material and has a diameter of about ⅛ inch. The intermediate portion of each pull line is capable of being loosely weaved through the spaced openings of the mesh adjacent the end edges of the net member. Each pull line has a length for allowing each rib to remain flat and in the horizontal plane above the bottom plate. Each pull line is capable of being drawn in an upwardly direction when the pull rope is moved in a upwardly direction by the holding member, and causing each rib to bend as gravity pulls the rectangular member in a downwardly direction. As the ribs bend upwardly a reshaping of the pentagonal shaped apparatus occurs causing a tear drop shaped apparatus to form. The tear drop shaped apparatus is capable of being lifted from the recipient surface and passed through an opening formed in a iced surface body of water. The tear drop apparatus is capable of trapping crabs within and carrying the crabs from the recipient surface through the opening of the iced surface body of water. The teardrop apparatus is further capable of being repositioned through the opening of the iced surface body of water, when the crabs are removed from within, and returning to the pentagonal shaped apparatus when the pull rope is released by the holding member.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved crabbing apparatus which has all of the advantages of the prior art crab catching devices and none of the disadvantages.

It is another object of the present invention to provide a new and improved crabbing apparatus which may be easily and efficiently manufactured and marketed.

It is further object of the present invention to provide a new and improved crabbing apparatus which is of durable and reliable constructions.

An even further object of the present invention is to provide a new and improved crabbing apparatus which is susceptible of a low cost of manufacture with regard to both materials and labor, and which accordingly is then susceptible of low prices of sale to the consuming public, thereby making such crabbing apparatus economically available to the buying public.

Still yet another object of the present invention is to provide a new and improved crabbing apparatus which provides in the apparatuses and methods of the prior art some of the advantages thereof, while simultaneously overcoming some of the disadvantages normally associated therewith.

Even still another object of the present invention is to provide a new and improved crabbing device for allowing a weighted apparatus placed through an opening cut in the frozen surface of a body of water to lye flat on the water's floor for trapping crabs and further allowing the apparatus, with trapped crabs, to be pulled from the water's floor through the opening in the water's frozen surface when in a closed configuration.

Lastly, it is an object of the present invention to provide a new and improved crabbing apparatus for ice crabbing comprising a bottom flat plate having an exterior surface, an interior surface and an outer edge therebetween and a plurality of holes forming five connecting hole pairs therethrough; a top flat plate having an exterior surface, an interior surface and an outer edge therebetween, and a plurality of holes forming five connecting hole pairs and four tying holes therethrough, each hole of the connecting hole pairs of the top plate being axially aligned with each hole of the connecting hole pairs of the bottom plate; a net member being positioned on the interior surface of the bottom plate having five end edges and a mesh therebetween; at least five elongated ribs with each rib having an external end with an aperture having an eye bolt coupled within and an internal end being interposed between the top plate and the bottom plate having a pair of holes therethrough, each rib extending in five different directions and being coupled to the net member to from a pentagonal shaped apparatus capable of maintaining a position on a recipient surface; a rectangular member having an upper surface, a lower surface positioned on the exterior surface of the top plate and a plurality of rectangular side walls therebetween and four securing holes positioned therethrough; a pair of bait lines having an intermediate portion positioned on the exterior surface of the top plate and beneath the lower surface of the rectangular member; a float having an upper eyelet with a pull rope attached and a lower eyelet; and five pull lines with each pull line having a proximal end coupled to the lower eyelet of the float and a distal end coupled to an associated eye bolt of each rib and an intermediate portion extending through an adjacent eye bolt, each pull line capable of being drawn in an upwardly direction for reshaping of the pentagonal shaped apparatus forming a tear drop shaped apparatus capable of passing through an opening formed in an iced surface body of water.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
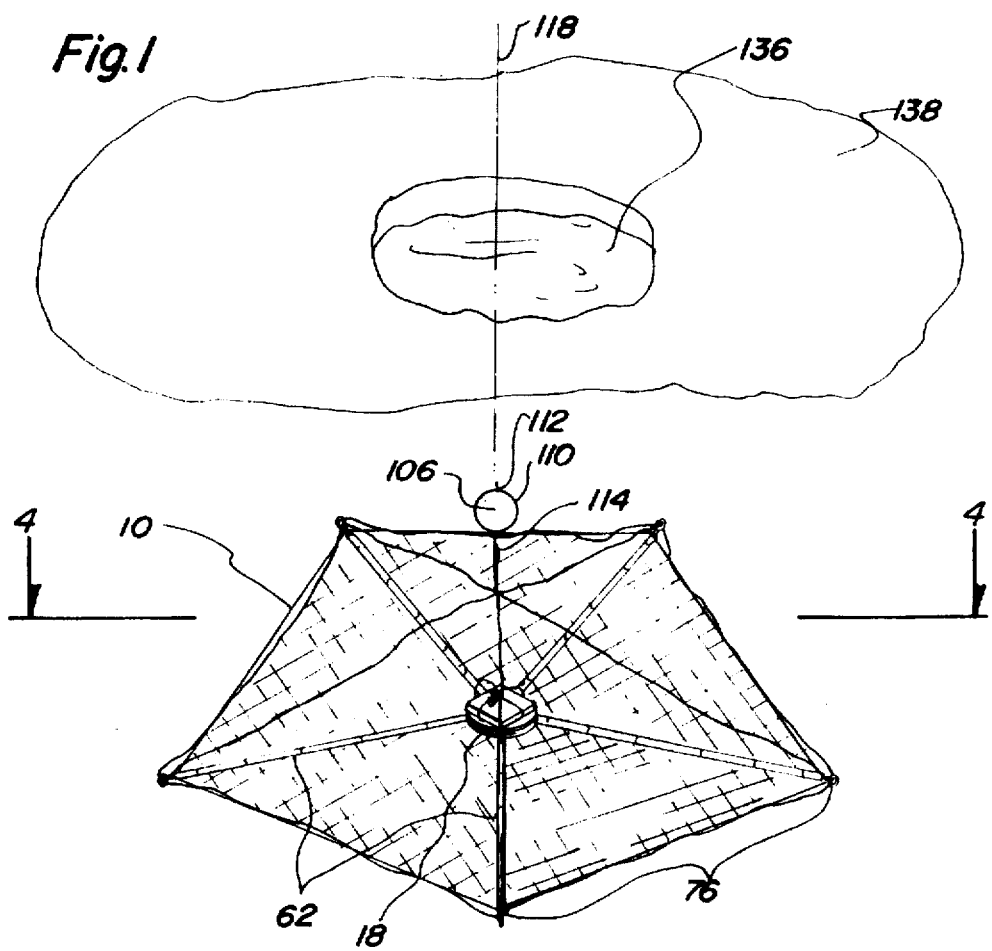
FIG. 1 is a perspective view of the preferred embodiment of the crabbing apparatus constructed in accordance with the principles of the present invention.

With reference now to the drawings, and in particular to FIG. 1 thereof, the preferred embodiment of the new and improved Crabbing apparatus embodying the principles and concepts of the present invention and generally designated by the reference numeral 10 will be described.

The present invention, the crabbing apparatus 10 is comprised of a plurality of components. Such components in their broadest context include plates, a net member, ribs, a rectangular member, bait lines, a float and pull lines. Such components are individually configured and correlated with respect to each other so as to attain the desired objective.

Figure 2:
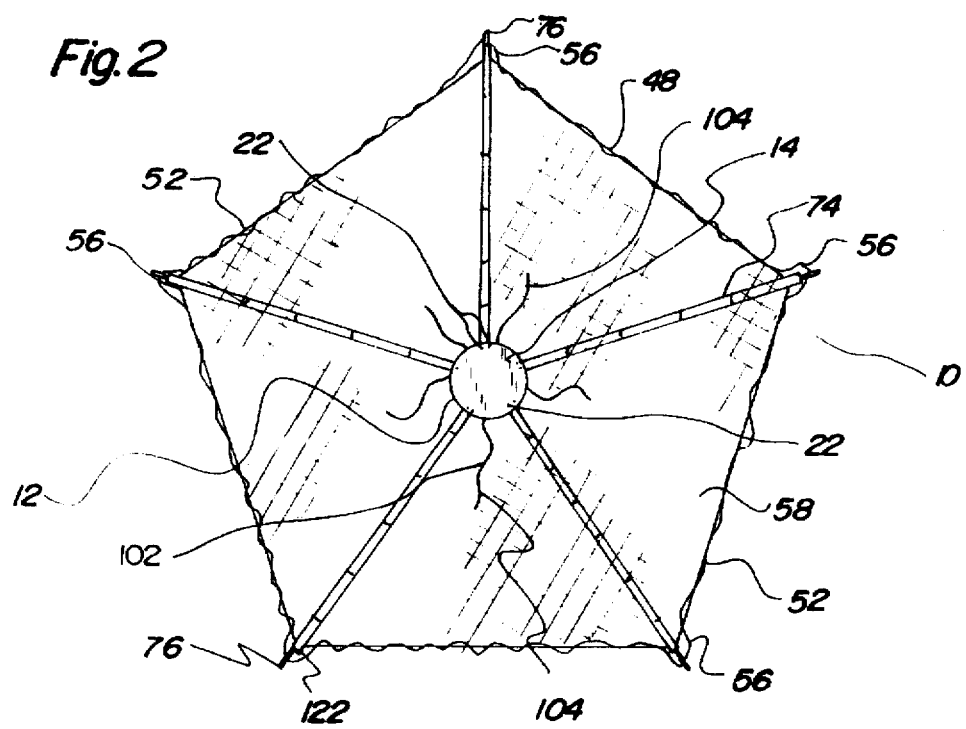
FIG. 2 is a bottom plan view of the preferred embodiment of the crabbing apparatus constructed in accordance with the principles of the present invention.
Figure 7:
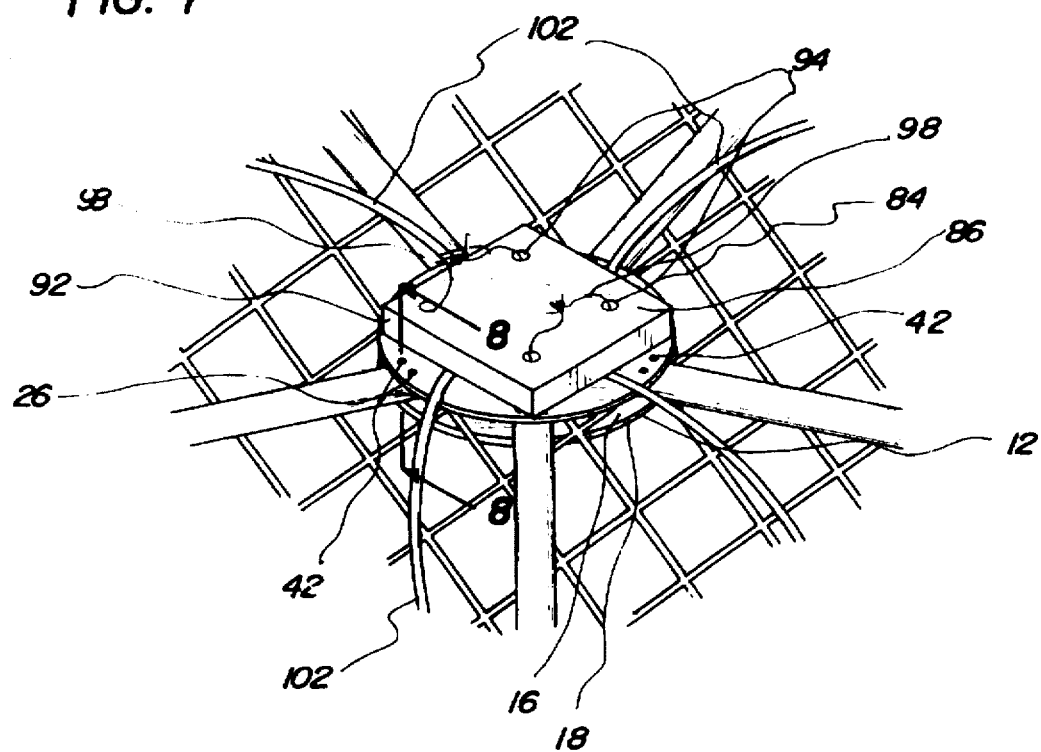
FIG. 7 is an enlarged sectional view showing the center portion of the present invention of FIG. 4.

Specifically, the present invention includes a bottom flat cylindrical plate 12 formed of a rigid material. As shown in FIGS. 2 and 7, the bottom plate has an exterior surface 14, an interior surface 16 and an outer edge 18 therebetween. The bottom plate, as shown in FIG. 2, is formed of aluminum. The bottom plate further has a plurality of holes therethrough. The holes forming five connecting hole pairs 22. Each connecting hole pair is symmetrically spaced apart from the other connecting hole pairs and adjacent the outer edge 18. The holes of the connecting holes pairs are laterally spaced. The bottom plate 12 has a diameter of about four inches.

Figure 8:
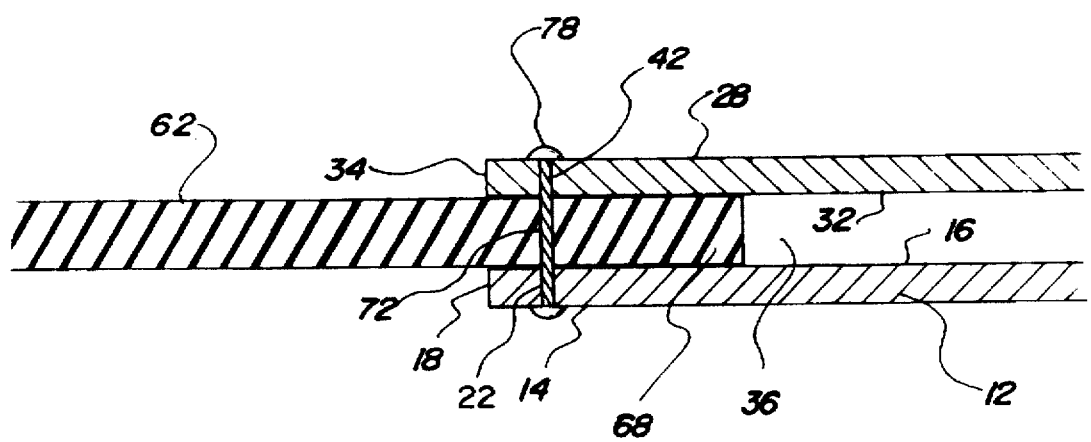
FIG. 8 is an enlarged sectional view of the coupling of a rib to the top and bottom plates.

Also included is a top plate 26 as shown in FIG. 7. The top flat cylindrical plate is formed of a rigid material having an exterior surface 28, an interior surface 32 and an outer edge 34 therebetween. The top plate is preferably made of aluminum. The top plate is in a horizontal plane parallel to and above the bottom plate with a space 36 being formed between the top and bottom plate 12 as shown in FIG. 8. The top plate having a plurality of holes therethrough. The holes forming five connecting hole pairs 42 and four tying holes 44. Each connecting hole pair is symmetrically spaced apart from the other connecting hole pairs and adjacent to the outer edge 34. Each hole of the connecting hole pairs 42 of the top plate are aligned along a common axis with each hole of the connecting hole pairs of the bottom plate 22 as illustrated in FIG. 8. FIG. 8 is a cross sectional view taken along one of the holes of the hole pairs of the top and bottom plate. Each tying hole being adjacent the other tying holes. The tying holes are spaced apart and centrally positioned through the top plate. The top plate has a diameter of about four inches.

As best illustrated by FIG. 2 a pentagonally shaped net member 48 is included. The net member is formed of flexible material having five end edges 52 and a mesh 54 therebetween. The net member is a commercially available gill net made of. Each end edge having a pair of end points 56 with each end point being common to an end point of an adjacent end edge. The mesh having square openings 58 of about 3 inches as shown in FIG. 2. The net member being position on the interior surface 16 of the bottom plate 12 in a horizontal plane below the top plate 26. The end edges 52 being spaced an equal distance from the outer edge 18 and 34 of the bottom plate and the top plate.

Figure 4:
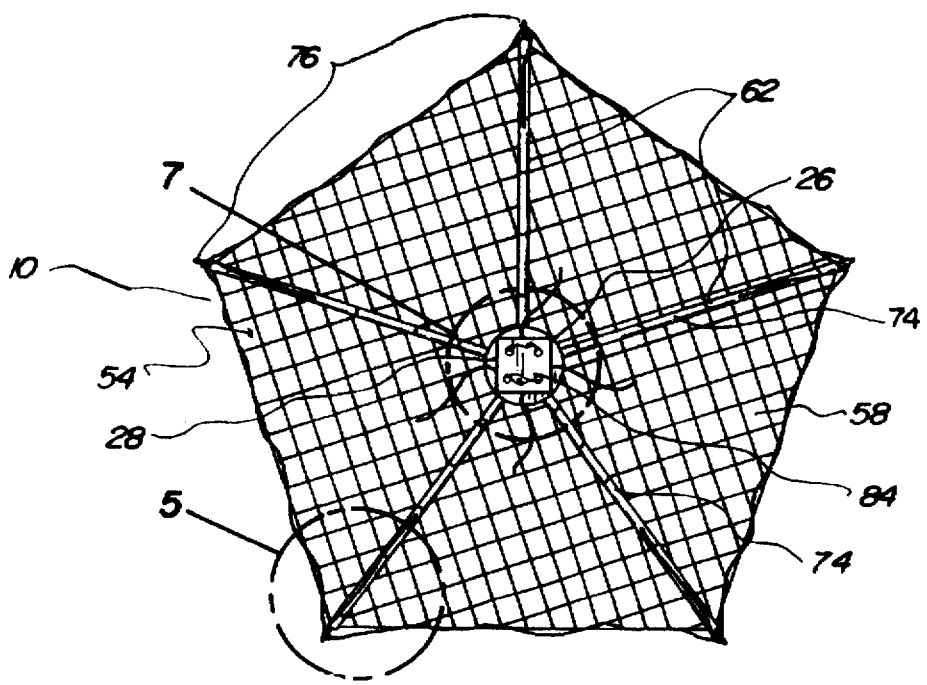
FIG. 4 is a top plan view of the preferred embodiment of the present invention.
Figure 5:
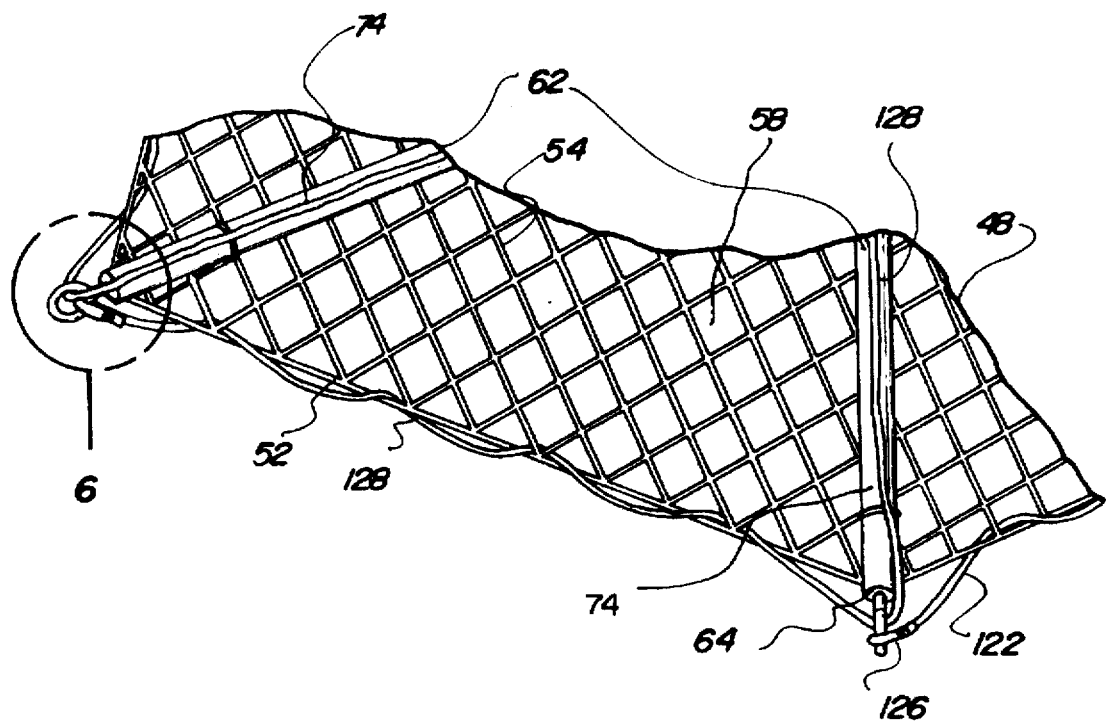
FIG. 5 is a sectional view of the present invention along line 4—4 of FIG. 1.
Figure 6:
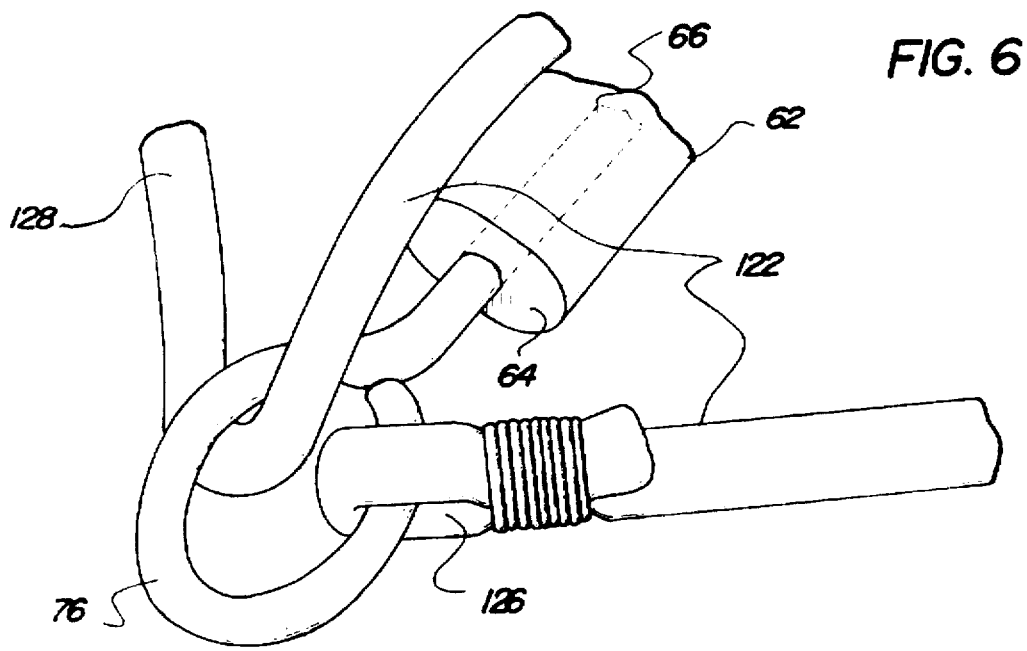
FIG. 6 is an enlarged view of the pull line and the eye bolts along enclosure 6 of FIG. 5.

Furthermore, at least five elongated oblong ribs 62 of flexible material positioned in a horizontal plane above the net member 48 and below the top plate 26, as shown in FIG. 4 are included. Each rib preferably is formed of baleen. Materials such as fiber glass or plastics of the type used in commercial fishing rods may be used. Each rib has an external 64 endswith an aperture 66 therein as shown in FIG. 6, and a internal end 68 with a pair of holes 72 therethrough. Each rib having a length of about 2 to 4½ feet. Each rib having a plurality of fasteners 74 coupling the ribs to the net member as shown in FIG. 5. Each fastener engaging the rib 62 and the mesh 54 at intervals along the rib beginning at a position adjacent each external end 64 and each end point 56 of the net. As best illustrated in FIG. 6, each external end having an eye bolt 76 coupled within the aperture 66. Each internal end 68 being interposed within the space 36 between the top plate 26 and the bottom plate 12 as shown in FIG. 7. Each hole of the pair of holes 72 being aligned along the common axis of each hole of the connecting hole pairs 42 and 22 of the top plate and bottom plate with rivets 78 coupling the connecting hole pairs and the internal ends 68 of the ribs 62. The ribs extending from the top plate and the bottom plate in five different directions. The ribs being coupled to the top and bottom plate and being secured to the net member with the fasteners form a pentagonal shape apparatus 10 capable of maintaining a flat position on a recipient surface.

To weight the apparatus down a generally rectangular member 84 is provided. The rectangular member is formed of rigid material having a flat upper surface 86, a flat lower surface 88 and a plurality of rectangular side walls 92 therebetween. The rectangular member, as shown in FIG. 7, has four securing holes 94 positioned therethrough. The lower surface is positionable on the exterior surface 28 of the top plate 26. Each securing hole is aligned along a common axis with each tying hole 44 of the top plate. The securing holes and the tying holes are coupled with a pair of strings 98. The rectangular member has a weight of about between 2 and 4 pounds. The weight is like commercially available diving weights.

A pair of bait lines 102 formed of flexible material is included. The bait lines, as shown in FIG. 7, have a pair of distal ends 104 and an intermediate portion 106 positioned on the exterior surface 28 of the top plate 26 beneath the lower surface 88 of the rectangular member 84. Each distal end is capable of supporting crab bait within the net member. The bait line is preferably commercially available heavy weight fishing line.

Figure 3:
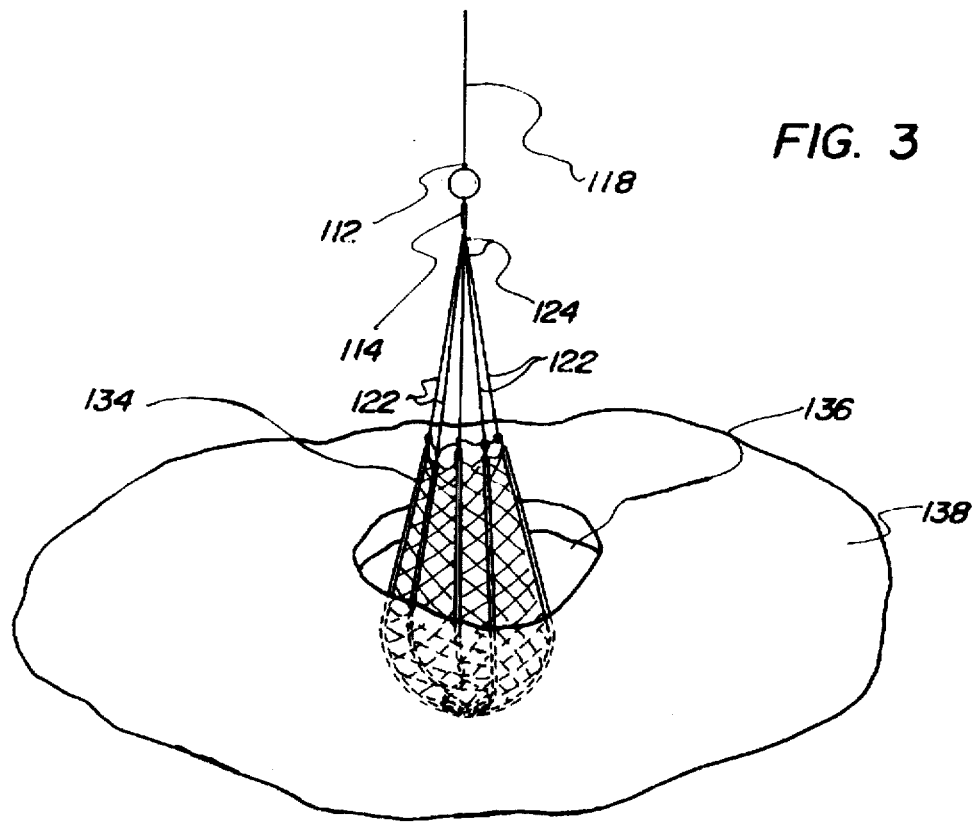
FIG. 3 is a perspective view of the preferred embodiment of the present invention in an operable configuration.

As best illustrated in FIG. 3, a spherical float 106 of rigid material is provided. The float is formed of a light weight plastic and has an exterior surface 110 with an upper eyelet 112 and a lower eyelet 114 attached thereto. The float has a cavity 116 with air trapped within. The upper eyelet has a pull rope 118 formed of flexible material coupled thereto. The pull rope is preferably made of nylon. The pull rope has a diameter of about ⅛ inch and is capable of being held by a person or device above the ice. The pull rope extends from above the icy surface to below the icy surface into the water.

Lastly, to support the pentagonal shaped apparatus of FIG. 1 are five pull lines 122. Each pull line has a proximal end 124 coupled to the lower eyelet of the float, as shown in FIG. 3 and a distal end 126 coupled to an associated eye bolt of each rib, with an intermediate portion 128 of each pull line extending through an adjacent eye bolt 76. Each pull line being formed of flexible material and having a diameter of about ⅛ inch. As best illustrated in FIG. 5, the intermediate portion of each pull line is capable of being loosely weaved through the spaced openings 58 of the mesh adjacent the end edges 52 of the net member 48. Weaving the pull line in and out of the net member allows the pull line to control the end edges of net member. Each pull line has a length for allowing each rib to remain flat and in the horizontal plane above the bottom plate. Each pull line capable of being drawn in an upwardly direction when the pull rope 118 is moved in a upwardly direction by the holding member. Moving the pull line with the pull rope will cause each rib 62 to bend as gravity pulls the rectangular member 84 in a downwardly direction and cause a reshaping of the pentagonal shaped apparatus 10 into a tear drop shaped apparatus 134 as shown in FIG. 3. The tear drop shaped apparatus is capable of being lifted from the recipient surface and passing through an opening 136 formed in a iced surface 138 body of water. The size of the tear shaped apparatus does not require the opening to be any larger than eighteen inches. The tear drop apparatus is capable of trapping crabs within and carrying the crabs from the recipient surface through the opening of the iced surface body of water. The teardrop apparatus 134 further is capable of being repositioned through the opening of the iced surface body of water when the crabs are removed from within. Once the tear drop apparatus is returned below the iced surface, the pull rope is loosened which loosens the pull lines. Loosening the pull line turns the tear drop shaped apparatus back into the pentagonal shaped apparatus.

The present invention is a crabbing apparatus that can be closed to fit through an opening cut in the iced surface of a body of water. The crabbing apparatus is made form an ⅛ inch diameter nylon rope, a 3 inch mesh gill net, eye bolts, aluminum plates, some rivets and a diving weight. The invention has the net centered and positioned on top of the bottom plate. The ribs are placed on top of the bottom plate with the holes of the ribs aligned with the connecting holes of the bottom plate. Next the top plate is placed on top of the ribs with the connecting holes of the top plate aligned with the holes of the ribs and the connecting holes of the bottom plate. Prior to placing the top plate on the ribs a pair of strings are positioned through the tying holes of the top plate. The parts are held together with rivets. The ribs are formed from baleen because it is flexible enough to close and durable enough to spring open as needed in the operation of the present invention. The bait lines are placed on the exterior surface of the top plate. The rectangular member is placed on over the bait lines on the exterior surface of the top plate. The pair of string dangling from the tying holes of the top plate are threaded through the securing holes of the rectangular member. The strings are tied together to secure the rectangular member on to the top plate. When it is time to use the apparatus bait is supported in the apparatus with the bait line. Once the apparatus in placed in the water a weight is necessary to ensure that the apparatus does not float to the surface because of the porousness of the rope. Eye bolts are attached to the ribs to allow the pull line to lace up to the apparatus with free movement. It is necessary to have a float because when the apparatus is in an open position resting on the sea floor it is important to keep the pull lines remain away from the crabs crawl space and the float provides the needed buoyance. The apparatus is allowed to remain in the water and after a period of time it is pulled up by the pull rope. Pulling on the pull rope causes the pull lines to bed drawn upward and inward to close the apparatus. Once the apparatus is closed it may be brought to the surface through the opening cut in the iced surface. The surfaces Of bodies of water that freeze over in the winter time are often very thick and difficult to cut. Usually the surface ice is 2 to 6 feet thick. Currently the crab pots available on the market are to bulky to use. Most would require a 3 to 5 foot diameter opening to be cut into an iced surface that is 2 to 6 feet thick. Such a task would be very long and nearly impossible for the average fisherman. The present invention solves the problems of the average fisherman crabbing for subsistence. The present invention only needs an eighteen inch opening for it to be placed through the iced surface.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved crabbing apparatus for ice crabbing that can be placed through an opening cut in the icy surface of a body of water to rest therebeneath for capturing many crabs at once comprising, in combination:

a bottom flat cylindrical plate formed of a rigid material having an exterior surface, an interior surface and an outer edge therebetween, the bottom plate further having a plurality of holes therethrough, the holes forming five connecting hole pairs, each connecting hole pair being symmetrically spaced apart from the other connecting hole pairs and adjacent the outer edge, the bottom plate having a diameter of about four inches;

a top flat cylindrical plate formed of a rigid material having an exterior surface, an interior surface and an outer edge therebetween, the top plate being in a horizontal plane parallel to and above the bottom plate with a space being formed between the top and bottom plate, the top plate having a plurality of holes therethrough, the holes forming five connecting hole pairs, each connecting hole pair being symmetrically spaced apart from the other connecting hole pairs and adjacent to the outer edge, each hole of the connecting hole pairs of the top plate being capable of aligning along a common axis with each hole of the connecting hole pairs of the bottom plate, the top plate having a diameter of about four inches;

a pentagonally shaped net member formed of flexible material having five end edges and a mesh therebetween, each end edge having a pair of end points with each end point being common to an end point of an adjacent end edge, the mesh having square openings of about 3 inches, the net member being positioned on the interior surface of the bottom plate in a horizontal plane below the top plate, the end edges being spaced an equal distance from the outer edge of the bottom plate and the top plate;

at least five elongated oblong ribs of flexible material positioned in a horizontal plane above the net member and below the top plate, each rib having an external end with an aperture therein and a internal end with a pair of holes therethrough, each rib having a length of about 2 to 4½ feet, each rib having a plurality of fasteners coupling the ribs to the net member, each fastener engaging the rib and the mesh at intervals along the rib beginning at a position adjacent each external end and each end point of the net, each external end having an eye bolt coupled within the aperture, each internal end being interposed within the space between the top plate and the bottom plate, each hole of the pair of holes being aligned along the common axis of each hole of the connecting hole pairs of the top plate and bottom plate with rivets coupling the connecting hole pairs and the internal ends of the ribs, the ribs extending from the top plate and the bottom plate in five different directions, the ribs being coupled to the top and bottom plate and being secured to the net member with the fasteners form a pentagonal shape apparatus capable of maintaining a flat position on a recipient surface;

a generally rectangular member formed of rigid material having a flat upper surface, a flat lower surface and a plurality of rectangular side walls therebetween, the rectangular member having four securing holes positioned therethrough, the lower surface being positionable on the exterior surface of the top plate, the securing holes being coupled to the top plate with a pair of strings, the rectangular member having a weight of about between 2 and 4 pounds;

a pair of bait lines formed of flexible material having a pair of distal ends and an intermediate portion positioned on the exterior surface of the top plate beneath the lower surface of the rectangular member;

a spherical float of rigid material having an exterior surface with an upper eyelet and a lower eyelet attached thereto, the upper eyelet having a pull rope formed of flexible material coupled thereto, the pull rope having a diameter of about ⅛ inch and capable of being held by a person; and five pull lines with each pull line having a proximal end coupled to the lower eyelet of the spherical float and a distal end coupled to an associated eye bolt of each rib with an intermediate portion of each pull line extending through an adjacent eye bolt, each pull line being formed of flexible material and having a diameter of about ⅛ inch, the intermediate portion of each pull line capable of being loosely weaved through the spaced openings of the mesh adjacent the end edges of the net member, each pull line having a length for allowing each rib to remain flat and in the horizontal plane above the bottom plate, each pull line capable of being drawn in an upwardly direction when the pull rope being moved in a upwardly direction by the holding member causing each rib to bend as gravity pulls the rectangular member in a downwardly direction causing a reshaping of the pentagonal shaped apparatus forming a tear drop shaped apparatus, the tear drop shaped apparatus capable of being lifted from the recipient surface and passing through an opening formed in a iced surface body of water, the tear drop apparatus capable of trapping crabs within and carrying the crabs from the recipient surface through the opening of the iced surface body of water, the teardrop apparatus further capable of being repositioned through the opening of the iced surface body of water when the crabs are removed from within and returning to the pentagonal shaped apparatus when the pull rope being released by the holding member.

2. A crabbing apparatus for ice crabbing comprising:

a bottom flat plate having an exterior surface, an interior surface and an outer edge therebetween and a plurality of holes forming five connecting hole pairs therethrough;

a top flat plate having an exterior surface, an interior surface and an outer edge therebetween, and a plurality of holes forming five connecting hole pairs, each hole of the connecting hole pairs of the top plate being capable of being axially aligned with each hole of the connecting hole pairs of the bottom plate;

a net member being positioned on the interior surface of the bottom plate having five end edges and a mesh therebetween;

at least five elongated ribs with each rib having an external end with an aperture having an eye bolt coupled within and an internal end being interposed between the top plate and the bottom plate having a pair of holes therethrough, each rib being coupled to the net member to form a pentagonal shaped apparatus capable of maintaining a position on a recipient surface;

a rectangular member having an upper surface, a lower surface positioned on the exterior surface of the top plate and a plurality of rectangular side walls therebetween and four securing holes positioned therethrough;

a pair of bait lines having an intermediate portion positioned on the exterior surface of the top plate and beneath the lower surface of the rectangular member;

a float having an upper eyelet with a pull rope attached and a lower eyelet; and five pull lines with each pull line having a proximal end coupled to the lower eyelet of the float and a distal end coupled to an associated eye bolt of each rib and an intermediate portion extending through an adjacent eye bolt, each pull line capable of being drawn in an upwardly direction for reshaping of the pentagonal shaped apparatus forming a tear drop shaped apparatus capable of passing through an opening formed in an iced surface body of water.

3. The crabbing apparatus for ice crabbing as set forth in claim 2 wherein the bottom plate being formed of a rigid material has a cylindrical shape with a diameter of about four inches.

4. The crabbing apparatus for ice crabbing as set forth in claim 2 wherein each connecting hole pair of the bottom plate being spaced apart from the other connecting hole pairs of the bottom plate and adjacent the outer edge of the bottom plate.

5. The crabbing apparatus for ice crabbing as set forth in claim 2 wherein the top plate formed of a rigid material has a cylindrical shape with a diameter of about four inches and being positionable in a horizontal plane above and parallel to the interior surface of the bottom plate to form a space therebetween.

6. The crabbing apparatus for ice crabbing as set forth in claim 2 wherein each connecting hole pair of the top plate being spaced apart from the other connecting hole pairs of the top plate and adjacent the outer edge of the top plate.

7. The crabbing apparatus for ice crabbing as set forth in claim 2 wherein the net member formed of a flexible material and positionable in a horizontal plane below the top plate with the mesh having a square opening of about 3 inches.

8. The crabbing apparatus for ice crabbing as set forth in claim 2 wherein each end edge being spaced an equal distance form the outer edge of the bottom and top plate having a pair of end points with each end point being common to an end point of an adjacent end point.

9. The crabbing apparatus for ice crabbing as set forth in claim 2 wherein each rib being oblong shaped and formed of a flexible material has a length of about 2 to 4½ feet.

10. The crabbing apparatus for ice crabbing as set forth in claim 2 wherein each hole of the pair of holes of the ribs being axially aligned with each hole of the connecting hole pairs of the top plate and the bottom plate with rivets coupling the connecting hole pairs and the internal ends of the ribs.

11. The crabbing apparatus for ice crabbing as set forth in claim 2 wherein each rib further having a plurality of fasteners for coupling the ribs to the net member at intervals along the rib beginning at a position adjacent each external end of the rib.

12. The crabbing apparatus for ice crabbing as set forth in claim 2 wherein the rectangular member has a weight of about 2 to 4 pounds and being formed of a rigid material.

13. The crabbing apparatus for ice crabbing as set forth in claim 2 wherein each securing hole being axially aligned with each tying hole of the top plate and coupled with a pair of strings.

14. The crabbing apparatus for ice crabbing as set forth in claim 2 wherein each bait line is formed of a flexible material and has a pair of distal ends.

15. The crabbing apparatus for ice crabbing as set forth in claim 2 wherein the float having a spherical shape with a cavity for trapping air within and being formed of a rigid material.

16. The crabbing apparatus for ice crabbing as set forth in claim 2 wherein the pull rope being formed of a flexible material having a diameter of about ⅛ inch and capable of being held by a holding member.

17. The crabbing apparatus for ice crabbing as set forth in claim 2 wherein each pull line formed of a flexible material having a diameter of about ⅛ inch, and a length for allowing the intermediate portion to be loosely weaved through the spaced openings of the mesh adjacent the end edges of the net member and further allowing the ribs to remain flat and in a horizontal plane above the bottom plate.

* * * * *